US012540056B2

(12) United States Patent
Fang

(10) Patent No.: US 12,540,056 B2
(45) Date of Patent: Feb. 3, 2026

(54) ADAPTIVE BOOM GUY CABLE SUPPORT AND GUY CABLE SYSTEM, AND ADJUSTMENT METHOD

(71) Applicant: JIANGSU GOLDWIND SCIENCE & TECHNOLOGY CO., LTD., Jiangsu (CN)

(72) Inventor: Jing Fang, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 192 days.

(21) Appl. No.: 18/294,254

(22) PCT Filed: Nov. 3, 2021

(86) PCT No.: PCT/CN2021/128323
§ 371 (c)(1),
(2) Date: Feb. 1, 2024

(87) PCT Pub. No.: WO2023/019744
PCT Pub. Date: Feb. 23, 2023

(65) Prior Publication Data
US 2024/0343527 A1 Oct. 17, 2024

(30) Foreign Application Priority Data
Aug. 18, 2021 (CN) ......................... 202110949167.2

(51) Int. Cl.
*B66C 13/06* (2006.01)

(52) U.S. Cl.
CPC .................................. *B66C 13/063* (2013.01)

(58) Field of Classification Search
CPC ......... B66C 23/70; B66C 23/68; B66C 23/66; B66C 23/64; B66C 23/62; B66C 13/06; B66C 13/063
See application file for complete search history.

(56) References Cited

U.S. PATENT DOCUMENTS 4,253,579 A * 3/1981 Williams .................. E02F 3/48 52/650.2
8,777,026 B2 * 7/2014 Han ........................ B66C 23/70 212/177

(Continued)

FOREIGN PATENT DOCUMENTS

CN 103342301 A 10/2013
CN 203428807 U 2/2014

(Continued)

OTHER PUBLICATIONS

CN 103803400A Machine Translation. (Year: 2014).*

(Continued)

*Primary Examiner* — Anna M Momper
*Assistant Examiner* — Juan J Campos, Jr.
(74) *Attorney, Agent, or Firm* — Frank Gao, Esq.

(57) ABSTRACT

A cable support is used for being mounted on a boom, and comprises two trusses symmetrically arranged with respect to the boom. In a first projection plane perpendicular to the length direction of the boom, truss rods of the trusses are arranged in a triangular shape. One end of a second truss rod and one end of a third truss rod are hingedly connected to two ends of a first truss rod, respectively. The other end of the second truss rod is hingedly connected to the other end of the third truss rod. The lengths of the first truss rod, the second truss rod and the third truss rod are all adjustable. The two ends of the first truss rod are respectively provided with detachable connection portions adapted to the boom, and the second truss rod or the third truss rod is provided with a cable rope guide portion.

20 Claims, 8 Drawing Sheets

(56) References Cited

U.S. PATENT DOCUMENTS

| | | | | |
|---|---|---|---|---|
| 9,108,827 | B2 * | 8/2015 | Willim | B66C 23/70 |
| 9,840,401 | B2 * | 12/2017 | Hansen | B66C 23/185 |
| 10,464,789 | B2 * | 11/2019 | Kataoka | B66C 23/64 |
| 2012/0080397 | A1 * | 4/2012 | Willim | B66C 23/70 212/177 |
| 2012/0205336 | A1 * | 8/2012 | Han | B66C 23/70 212/347 |
| 2015/0183620 | A1 * | 7/2015 | Hansen | B66C 23/185 212/273 |

FOREIGN PATENT DOCUMENTS

| | | | |
|---|---|---|---|
| CN | 103803400 | A | 5/2014 |
| CN | 108756254 | A | 11/2018 |
| CN | 110203833 | A | 9/2019 |
| CN | 112209217 | A | 1/2021 |
| CN | 113044716 | A | 6/2021 |
| DE | 102019109204 | A1 | 10/2019 |
| EP | 2189574 | A1 | 5/2010 |

OTHER PUBLICATIONS

Extended European Search Report dated Nov. 12, 2024; Appln. No. 21953980.6.

The International Search Report mailed Mar. 28, 2022; PCT/CN2021/128323.

* cited by examiner

ADAPTIVE BOOM GUY CABLE SUPPORT AND GUY CABLE SYSTEM, AND ADJUSTMENT METHOD

This application is a National Phase entry of PCT Application No. PCT/CN2021/128323, filed on Nov. 3, 2021, which claims the priority of the Chinese Patent Application No. 202110949167.2, titled "ADAPTIVE BOOM GUY CABLE SUPPORT AND GUY CABLE SYSTEM, AND ADJUSTMENT METHOD", filed on Aug. 18, 2021 with the China National Intellectual Property Administration, which isare incorporated herein by reference in their entireties.

FIELD

The present application relates to the technical field of wind power generation, and in particular relates to an adaptive boom guy cable bracket, a guy cable system, and an adjustment method.

BACKGROUND

With the rapid development of applications of offshore wind power technology, the number of installation ships for construction are relatively scarce. For the installation of offshore units, the reliability requirements of a blade for a wind turbine in the installation process particularly matter. As well known, the structure of the installation ship is not allowed to be adjusted, and a crane of the installation ship cannot be significantly modified based on specific installation requirements of the blade. The conventional guy cable brackets used for blade installation are formed by welding. A connecting port of the guy cable brackets can only be designed for a boom of a specific installation ship, and is not applicable to other booms. This results in a huge waste of resources and high construction costs.

In view of this, how to optimize the design of the structure of the conventional guy cable for wind turbine installation has attracted the attention of those skilled in the art, so as to effectively improve the versatility of the guy cable bracket while ensuring operational safety and reliability.

SUMMARY

In order to solve the above technical problems, an adaptive boom guy cable bracket, a guy cable system and an adjustment method are provided according to the present application, to solve the above technical problems.

The adaptive boom guy cable bracket according to the present application is configured to be mounted on a boom. The adaptive boom guy cable bracket includes two trusses arranged symmetrically with respect to the boom. In a first projection plane perpendicular to a length direction of the boom, three truss rods of each of the two trusses are arranged in a triangular shape, one end of a second truss rod is hinged with one end of a first truss rod and one end of a third truss rod is hinged with the other end of the first truss rod, the other end of the second truss rod is hinged with the other end of the third truss rod, and the first truss rod, the second truss rod and the third truss rod each is adjustable in length. Each of two ends of the first truss rod is provided with a detachable connecting part which is adaptable to the boom, and the second truss rod or the third truss rod is provided with a hawser guiding portion.

In an embodiment, two groups of the first truss rod, the second truss rod and the third truss rod are provided, and in a second projection plane parallel to the length direction of the boom, the first truss rods in the two groups are spaced apart, and the other end of the second truss rod and the other end of the third truss rod in each of the two groups are intersected.

In an embodiment, the second truss rod is located above the third truss rod; the second truss rod includes a truss rod body and a connecting rope group, and the truss rod body is provided with a winding component for winding the connecting rope group, and the other end of the third truss rod is provided with a hinged pulley system; the connecting rope group is wound around the hinged pulley system, and a working length of the connecting rope group is adjusted by a driving component for driving the winding component to rotate.

In an embodiment, the detachable connecting part is a hold hoop structure.

In an embodiment, the first truss rod and the second truss rod each includes a truss rod body, truss rod bodies of the first truss rod, the second truss rod and the third truss rod are configured to have a first rod, a second rod and a middle adjustment sleeve, and the first rod and the second rod are inserted into the middle adjustment sleeve from two ends, respectively, and the length of the corresponding truss rod body is adjusted by adjusting insertion lengths of the first rod and the second rod.

In an embodiment, multiple adjusting pin holes spaced apart along an axial direction are formed in the middle adjustment sleeve, pin fixing holes are formed in the first rod and the second rod and are configured to be aligned with the corresponding adjusting pin holes based on the insertion lengths of the first rod and the second rod, and are fixed by positioning through pins in the pin fixing holes and the corresponding adjusting pin holes.

In an embodiment, the hawser guiding portion is a guiding pulley for which a hawser is extendable in a universal direction.

In an embodiment, the adaptive boom guy cable bracket further includes a support oil cylinder, and two ends of the support oil cylinder are respectively hinged with the truss rod bodies of the second truss rod and the third truss rod.

An adaptive boom guy cable system is provided according to the present application. The adaptive boom guy cable system includes: the adaptive boom guy cable bracket according to any one of the embodiments; and two hoists, which are respectively provided corresponding to the two trusses, and a traction steel wire rope of each of the two hoists bypasses the corresponding hawser guiding portion, and one end of the traction steel wire rope is configured to pull a lifting device.

In an embodiment, the adaptive boom guy cable system further includes: two tension sensors and a controller. The two tension sensors are respectively provided on the two traction steel wire ropes and are configured to collect a tension force of the two traction steel wire ropes, and the controller is configured to output a first control instruction to the driving component based on the tension force, so as to adjust a working length of the connecting rope group.

In an embodiment, the adaptive boom guy cable system further includes a support oil cylinder, two ends of the support oil cylinder are respectively hinged with the truss rod bodies of the second truss rod and the third truss rod, and the controller is further configured to output a second control instruction to a control end of the support oil cylinder based on the tension force, so as to adjust a working length of the support oil cylinder.

In an embodiment, the adaptive boom guy cable system further includes: two damping devices, which are respectively provided on the two traction steel wire ropes.

In an embodiment, the adaptive boom guy cable system further includes: a wind measurement system and a wind and solar energy storage battery, and the wind measurement system is provided on the guy cable bracket and configured to collect wind data and transmit the wind data to the controller; the wind and solar energy storage battery is configured to provide power for the wind measurement system, and the wind and solar energy storage battery further includes an external charging interface.

An adjustment method for an adaptive boom guy cable system is further provided according to the present application. The adaptive boom guy cable system includes: the adaptive boom guy cable bracket according to any one of the embodiments; and two hoists, which are respectively provided corresponding to the two trusses, and the traction steel wire rope of each of the two hoists bypasses the corresponding hawser guiding portion, and one end of the traction steel wire rope is configured to pull a lifting device; and the adjustment method for the adaptive boom guy cable system includes: driving the winding component to rotate to adjust a working length of the connecting rope group, and adjusting an included angle between an extending direction of the traction steel wire rope and a pulling direction by a change in an operating position of the hawser guiding portion.

In an embodiment, the driving the winding component to rotate to adjust the working length of the connecting rope group includes: outputting a first control instruction to the driving component based on a tension force of the traction steel wire rope, and adjusting the working length of the connecting rope group by the driving component.

In an embodiment, a support oil cylinder is hinged between the truss rod bodies of the second truss rod and the third truss rod; and in addition to that the first control instruction is outputted to the driving component based on the tension force of the traction steel wire rope, a second control instruction is outputted to a control end of the support oil cylinder, so as to adjust a working length of the support oil cylinder.

With regard to the characteristics of offshore construction operations of a wind turbine, a guy cable bracket configured to be mounted on the boom is proposed in another approach in the present application. Specifically, two trusses arranged symmetrically with respect to the boom are configured such that the length of each truss rod is adjustable and the truss rods are articulated in sequence. In this way, on one hand, the size of a connecting port is adjustable based on the actual boom structure, so as to be suitable for booms of different installation ships. The truss rods are assembled and fixed to the boom structure by using the detachable connecting parts at two ends of the first truss rod, which can be reused after disassembly, thereby reducing the construction costs. On the other hand, in the first projection plane perpendicular to the length direction of the boom, the truss rods of each of the trusses are arranged in a triangular shape. Based on the connection manner of the truss rods being sequentially hinged, the length of the corresponding truss rod and the operating position of the hawser guiding portion on the truss can be adjusted based on actual sizes of a component to be installed and an auxiliary tool, ensuring a safe distance between the component to be installed and the auxiliary tool, and the boom, and further adapting to the construction requirements of different products to be installed. Compared with the conventional technology, the application of the solution has the following advantageous technical effects:

Firstly, the guy cable bracket provided by this solution has an adjustable connecting port, which is compatible with the boom suitable for different installation ships, and has good versatility. Furthermore, based on the adjustable structure of the truss in the solution, after being installed on the boom, the trusses can be adjusted in a wide range of angles according to actual construction requirements, thereby adjusting the guy cable tension force to an optimal state.

Secondly, in the preferred solution of the present application, the second truss rod located above the third truss rod is further optimized. The second truss rod includes the truss rod body and the connecting rope group. The connecting rope group is connected between the truss rod body of the second truss rod and the third truss rod, the total length of the second truss rod can be adjusted by adjusting the working length of the connecting rope group, thereby changing the operating position of the hawser guiding portion relative to the boom. In this way, adjustments can be performed according to the actual construction situation, for example, but not limited to, when the guy cable force changes suddenly, the driving component is controlled to drive the winding component to rotate. Based on the change in the working length of the connecting rope group, the operating position of the hawser guiding portion changes accordingly. On the whole, problems of affecting construction safety and reliability can be avoided by reducing the force acting on the guy cable bracket.

Thirdly, in the adaptive boom guy cable system according to the present application, the magnitude of the tension force is obtained in real time through the tension sensor provided on the traction steel wire rope, the first control instruction is outputted to adjust the working length of the connecting rope group, and the winding component is driven to rotate by the driving component. In this way, closed-loop control can be performed on the adjustment of the working position of the hawser guiding portion relative to the boom, further ensuring the safety and reliability of the installation and construction.

Fourthly, in another preferred solution of the present application, the support oil cylinder is further provided between the truss rod bodies of the second truss rod and the third truss rod to further improve the overall load-bearing capacity of the guy cable bracket; and in addition to the first control instruction, the second control instruction for controlling an expansion or retraction action of the support oil cylinder is outputted, to adaptively adjust the working length of the support oil cylinder, which, in cooperation with the adjustment of the working length of the connecting rope group, allows the second truss rod to be in a good stress state and improves the load-bearing stability.

Figure 1:
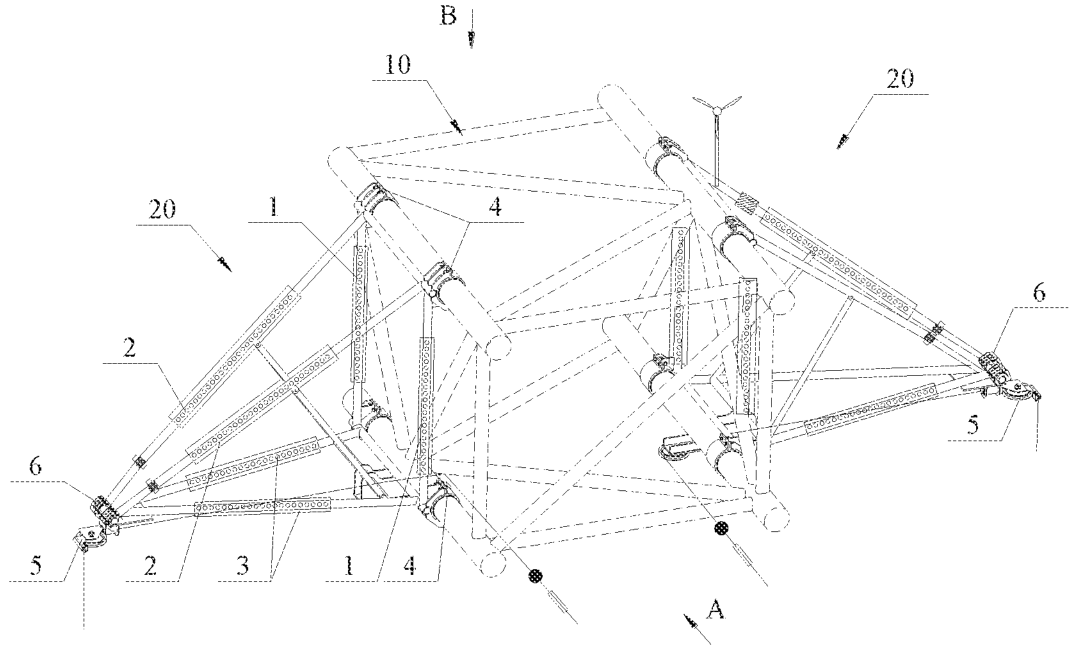
FIG. 1 is a schematic assembly view of a guy cable bracket according to an embodiment.

Reference numerals in the Figures are as follows:

boom 10, truss 20, blade 30, lifting device 31, hoist 40, tension sensor 50, support oil cylinder 60, damping device 70, wind measurement system 80, wind and solar energy storage battery 90, controller 100;

first truss rod 1, first rod 11, middle adjustment sleeve 12, second rod 13, adjusting pin hole 14, pin fixing hole 15, pin 16, second truss rod 2, truss rod body 21, connecting rope group 22, winding component 23, winding component bracket 231, servo motor 24, third truss rod 3, hold hoop 4, guiding pulley 5, pulley 51, pulley bracket 52, rotating shaft 53, bracket support 54, bolt pair 55, rope extending baffle 56, hinged pulley system 6, traction steel wire rope 7, and direction-changing pulley 8.

DETAILED DESCRIPTION OF THE EMBODIMENTS

In order to enable those skilled in the art to better understand the technical solutions of the present application, the present application is described in further detail below in conjunction with the accompanying drawings and specific embodiments.

Without loss of generality, in this embodiment, a guy cable bracket which can provide an adaptable universal interface according to the present solution is described in detail on the basis of a main structure of boom segments 10 shown in FIG. 1. Crane boom structures for different installation ships have different dimensions. It should be understood that the core conception of the present application does not lie in the specific implementation of the function of the boom, which does not constitute substantial limitations to a guy cable bracket and a guy cable system claimed in the present application.

With reference to FIG. 1, FIG. 1 is a schematic assembly view of the guy cable bracket according to the present embodiment.

As shown in the FIG. 1, the guy cable bracket according to the embodiment includes two trusses 20 arranged symmetrically with respect to the boom 10. Each of the two trusses 20 is detachably connected to the boom 10, and has a truss rod with an adjustable length.

In order to clearly describe the relative position and connection relationship between the truss rods, two projection planes are defined herein as a description benchmark. A first projection plane is formed in a direction indicated by arrow A in the FIG. 1. That is, the first projection plane is perpendicular to a length direction of the boom 10. A second projection surface is formed in the direction indicated by arrow B in the FIG. 1. That is, the second projection surface is parallel to the length direction of the boom 10 and perpendicular to the direction of arrow B.

Figure 2:
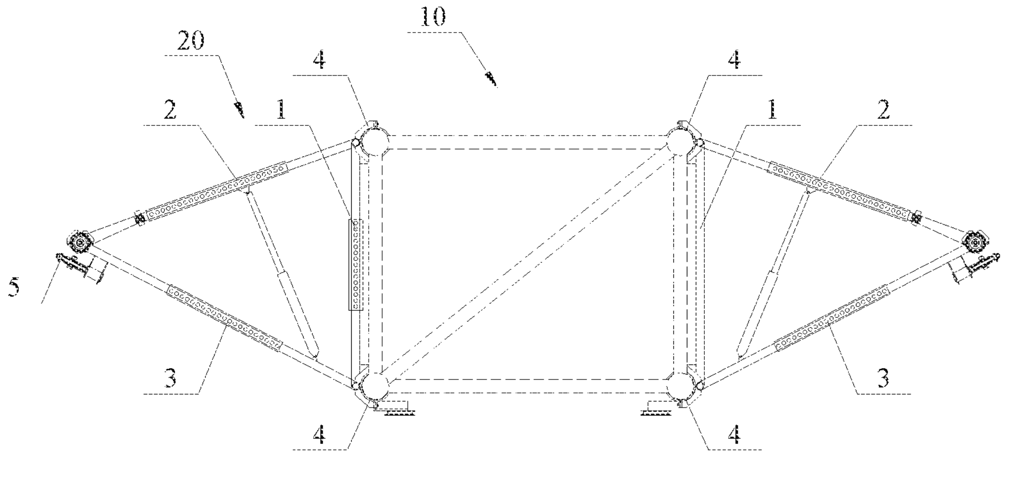
FIG. 2 is a view taken along a direction A of FIG. 1.
Figure 3:
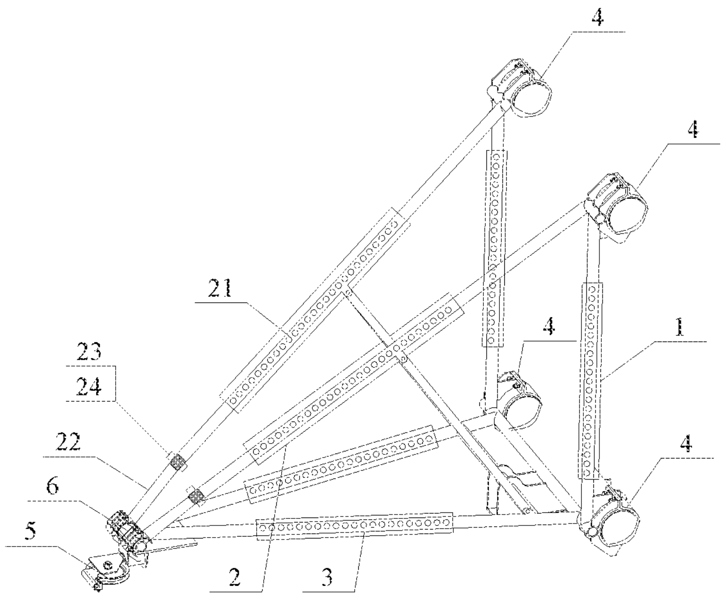
FIG. 3 is a schematic view showing the overall structure of trusses at one side as shown in FIG. 1.

In the first projection plane perpendicular to the length direction of the boom, truss rods of each of the two trusses 20 are arranged in a triangular shape. Reference is made to FIGS. 2 and 3 together. FIG. 2 is a view taken along a direction A of FIG. 1, and FIG. 3 is a schematic view showing the overall structure of trusses at one side. The trusses 20 at both sides have the same structures, and the trusses 20 at one side are described in detail here.

As shown in FIGS. 1 and 2, a first truss rod 1 is arranged close to the boom 10, and each of two ends of the first truss rod 1 is provided with a detachable connecting part which is adaptable to the boom 10. In this solution, the detachable connecting part is configured as a structure of a hold hoop 4 to adapt to an arm rod of the boom 10. When being installed, the structure of the hold hoop 4 is fastened to the corresponding arm rod and can be reliably fixed by using a threaded fastener.

Of course, alternatively, the detachable connecting part can be implemented in other structural forms, as long as the functional requirements of being structurally adapted to the arm rod and easy to disassemble and assemble can be met, the structural forms fall within the scope of protection claimed by the present application.

One end of a second truss rod 2 is hinged with one end of the first truss rod 1 and one end of a third truss rod 3 is hinged with the other end of the first truss rod 1, and the other end of the second truss rod 2 is hinged with the other end of the third truss rod 3. The first truss rod 1, the second truss rod 2 and the third truss rod 3 each is adjustable in length. In this way, the size of a connecting port can be adjusted according to the actual boom structure. In other words, the length of the first truss rod 1 is adjusted so that the distance between the hold hoops 4 meets the requirements for spacing between two arm rods of the boom 10, so as to be applied in booms of different installation ships. After construction is completed, the hold hoops 4 can be disassembled and reused, which can effectively reduce the construction costs.

In addition, a hawser guiding portion 5 is provided on the third truss rod 3 for adapting a hawser 7 to form a force for pulling a component to be installed or a special auxiliary clamping device and other structures, for example, but not limited to, a lifting device 31 of the blade of the wind turbine. In the usage state shown in FIG. 10, the lifting device 31 is located at one side, adjacent to the third truss rod 3, of the guy cable bracket. The hawser guiding portion may be provided on the second truss rod 2, which can also meet the needs of the function of adapting to the hawser. In comparison, the hawser guiding portion being provided on the third truss rod 3 can avoid the interference of reeving and help to form a better guide configuration relationship.

In one implementation, the hawser guiding portion may be configured as a guiding pulley 5 to smoothly guide the hawser 7 to form a tension force according to a set direction.

Figure 10:
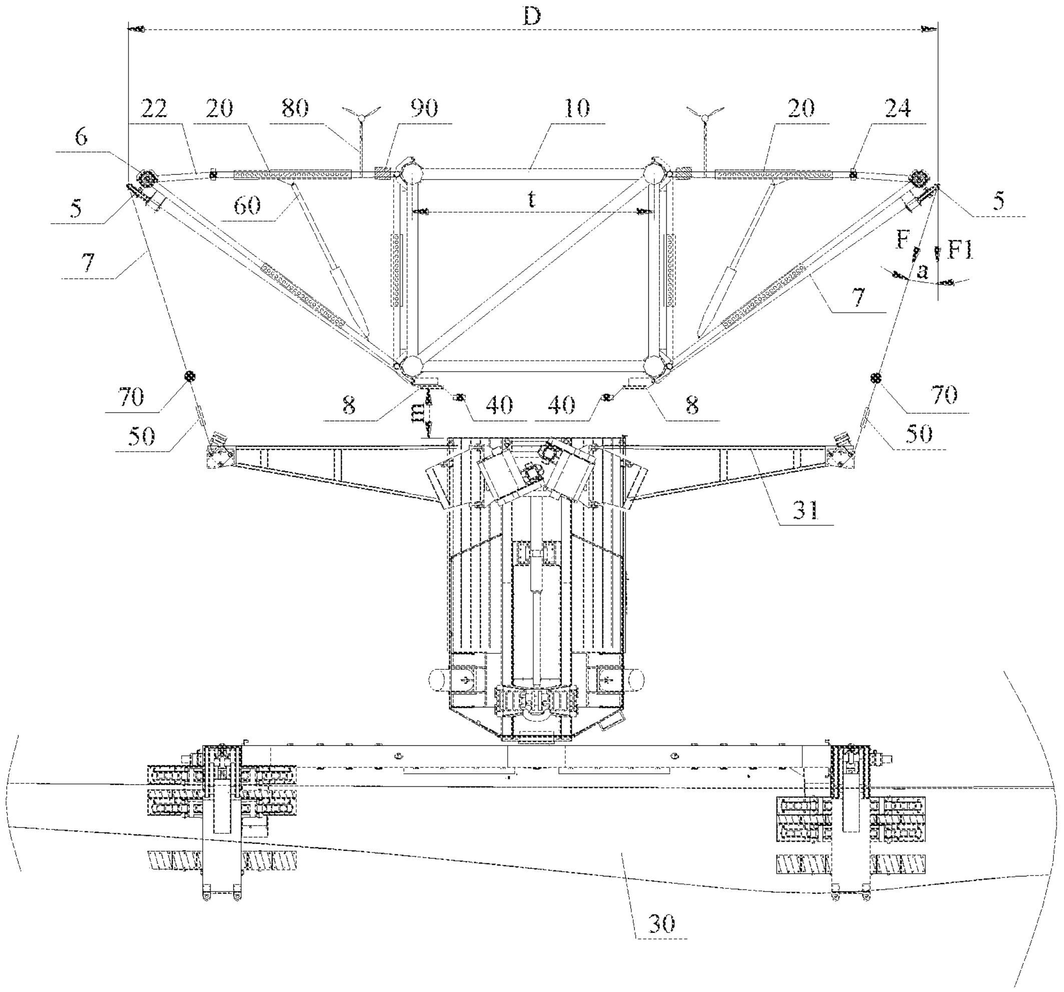
FIG. 10 is a schematic view showing a usage state of an adaptive boom guy cable system according to an embodiment.

Furthermore, based on the connection manner of the truss rods being sequentially hinged, the length of the corresponding truss rod can be adjusted based on the actual size of a component to be installed and an auxiliary tool. That is to say, after the length of the first truss rod 1 is adjusted, the size of the second truss rod 2 and the third truss rod 3 can be further adjusted, thereby adjusting the operating position of the hawser guiding pulley 5 on the truss, so as to ensure a safe distance m between the component to be installed, the auxiliary tool, and the boom, as shown in FIG. 10, which can further accommodate the construction requirements of different products to be installed.

Figure 4:
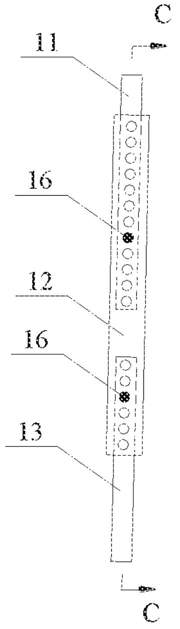
FIG. 4 is a schematic view showing assembly relationship of a first truss rod as shown in FIG. 1.
Figure 5:
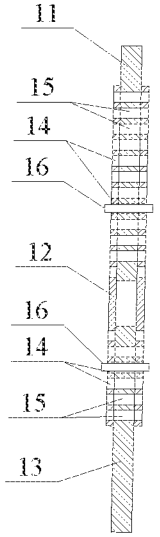
FIG. 5 is a cross-sectional view taken along a line C-C of FIG. 4.

It should be noted that the first truss rod 1, the second truss rod 2 and the third truss rod 3 have the characteristics of adjustable length, and at the same time meet the reliability requirement of having a fixed working length under the adjusted length. The first truss rod 1, the second truss rod 2 and the third truss rod 3 each includes a truss rod body. In fact, the truss rod bodies of the first truss rod 1, the second truss rod 2 and the third truss rod 3 may be configured as different structures, for example, but not limited to, separate nesting of upper and lower segments. The first truss rod structure shown in FIGS. 5 and 10 is described hereinafter as an example. FIG. 4 is a schematic view showing assembly relationship of the first truss rod 1 as shown in FIG. 1, and FIG. 5 is a cross-sectional view taken along a line C-C of FIG. 4.

The truss rod body has a first rod 11, a second rod 13 and a middle adjustment sleeve 12. The first rod 11 and the second rod 13 are inserted into the middle adjustment sleeve 12 from two ends, respectively. The length of the corresponding truss rod body is adjusted by adjusting insertion lengths of the first rod 11 and the second rod 13.

As an exemplary structure, as shown in FIGS. 4 and 5, multiple adjustment pin holes 14 spaced apart along an axial direction are formed in the middle adjustment sleeve 12, and pin fixing holes 15 are formed in the first rod 11 and the second rod 13 and are configured to be aligned with the corresponding adjusting pin holes 14 based on the insertion lengths of the first rod 11 and the second rod 15, and are fixed by positioning through pins 16 in the pin fixing holes 15 and the corresponding adjusting pin holes.

Theoretically, the number of the pin fixing holes 15 in the first rod 11 and the second rod 13 and the number and distribution interval of the adjusting pin holes 14 in the middle adjustment sleeve 12 are not limited, and can be determined according to the actual product design. It should be understood that as long as the length of the corresponding truss rod can be adjusted to match the extending direction of the hawser based on the angle adjustment requirements of the hawser, it is within the scope of protection claimed by the present application.

In order to improve the load-bearing stability of the truss structure, as shown in FIG. 1, two groups of the first truss rod 1, the second truss rod 2 and the third truss rod 3 are provided, and in a second projection plane parallel to the length direction of the boom 10, the first truss rods 1 in the two groups are spaced apart, and the other end of the second truss rod 2 and the third truss rod 3 in each of the two groups are intersected. That is, the hold hoops 4, adapted to the arm rods of the boom 10, which is provided on the first truss rod 1 are spaced apart, and one side, where the guiding pulley 5 is mounted, of each of the two groups is gathered together. When the guiding pulley 5 at this position is stressed, the trusses 20 at each side have good load-bearing stability.

The second truss rod 2 is located above the third truss rod 3. Specifically, the second truss rod 2 includes a truss rod body 21 and a connecting rope group 22. That is, the connection area of the second truss rod 2 is composed of two parts of the working length. As shown in FIG. 3, a winding component 23 for winding the connecting rope group 22 may be provided on the truss rod body 21, and a hinged pulley system 6 is provided at the other end of the third truss rod 3. The cable of the connecting rope group 22 is wound around the hinged pulley system 6. The working length of the connecting rope group 22 is adjusted by the driving component 24 that drives the winding component 23 to rotate. It should be noted that the basic hinged relationship between the second truss rod 2 and the third truss rod 3 is realized by the winding manner of connecting rope group 22 and the hinged pulley system 6.

The driving component is preferably a servo motor 24, which can specifically drive the winding component 23 to release or retract the rope in response to a control instruction. The rope-releasing operation of the winding component 23 can lengthen the working length of the connecting rope group 22, and the rope-retracting operation of the winding component 23 can shorten the working length of the connecting rope group 22.

Thereby, the total length of the connectable area of the second truss rod 2 is adjusted, thereby changing the operating position of the hawser guiding pulley 5 relative to the boom 10. In this way, adjustments can be made according to the actual construction situation, for example, but not limited to, when the guy cable force changes suddenly, the servo motor 24 is controlled to drive the winding component 23 to rotate. Based on the change in the working length of the connecting rope group 22, the operating position of the guiding pulley changes accordingly. Overall, the force acting on the guy cable bracket can be reduced.

Figure 6:
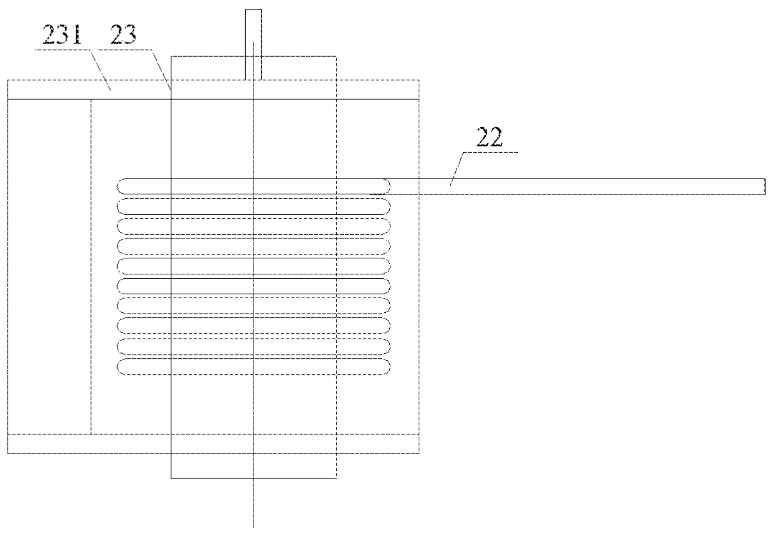
FIG. 6 is a schematic view showing assembly relationship between a connecting rope group and a winding component according to an embodiment.

It should be noted that the winding manner of a steel wire rope of the connecting rope group 22 on the winding component 23 and the specific configuration of the winding component 23 and the servo motor 24 can be determined according to different product design requirements, for example, but not limited to, schematic view showing assembly relationship between the connecting rope group and a winding barrel as shown in FIG. 6. That is, the winding component configured to realize the retracting and releasing of the steel wire rope of the connecting rope group 22 may be implemented in other structures, as long as it can meet the functional requirements of adjusting the working length of the connecting rope group 22.

As shown in FIG. 6, the winding component 23 may be arranged on a winding component bracket 231, and is fixed on the truss rod body 21 of the second truss rod 2 through the winding component bracket 231. The steel wire rope of the connecting rope group 22 is wound around the winding component 23 and wound around the hinged pulley system 6. The servo motor 24 may be arranged on the winding component 23 or on the winding component bracket 231 to provide rotational driving force of the winding component 23, so as to complete the rope-releasing operation of the winding component 23.

Figure 7:
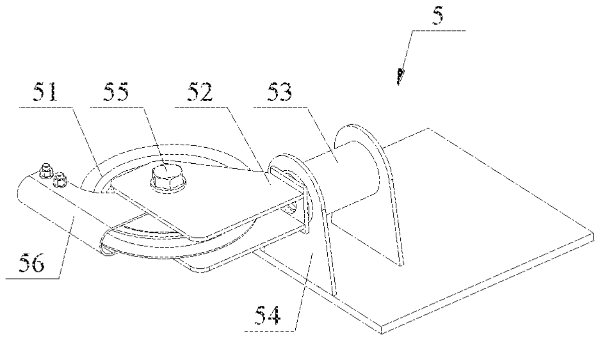
FIG. 7 is a schematic structural view of a guiding pulley according to an embodiment.

In order to enable the guy cable angle to have an adaptive adjustment function, the structural assembly provided on the guiding pulley 5 is further optimized. Reference is made to FIG. 7, which shows a schematic structural view of a guiding pulley for which a hawser is extendable in a universal direction.

Figure 8:
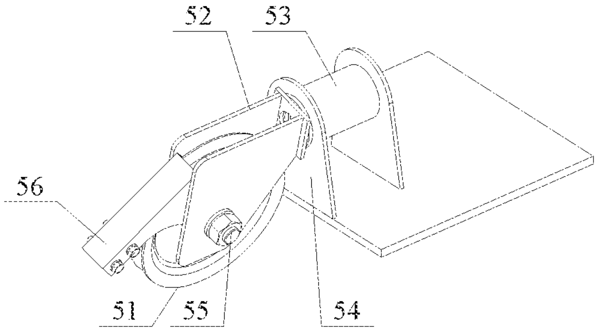
FIGS. 8 and 9 respectively show two usage states of the guiding pulley shown in FIG. 7.

The guiding pulley 5 includes a pulley 51, a pulley bracket 52, a rotating shaft 53 and a bracket support 54. As shown in FIG. 7, the pulley 51 is mounted on the pulley bracket 52 through a bolt pair 55, and can rotate around the bolt pair 55 relative to the pulley bracket 52. The pulley bracket 52 is connected to the rotating shaft 53, and the rotating shaft 53 is inserted into an opening of the bracket support 54. The pulley bracket 52 can rotate around the rotating shaft 53 relative to the bracket support 54, so that the pulley 51 can rotate along with the pulley bracket 52. Reference may be made to a schematic view of the usage state shown in FIG. 8 for details.

The pulley bracket 52 may be further provided with a rope extending baffle 56. The rope extending baffle 56 may be pivoted with the bolt pair 55 to rotate relative to the pulley bracket 52 with the adjustment of the rope extending angle.

Figure 9:
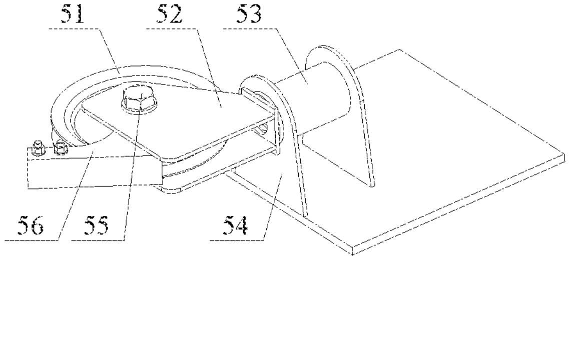

Reference may be made to a schematic view of the usage state shown in FIG. 9 for details. Specifically, the rope extending baffle 56 is internally provided with a nylon structure inside to ensure smooth rope entry and exit and avoid rope tangles.

Further reference is made to FIG. 10, which shows a schematic view showing a usage state of an adaptive boom guy cable system. In the usage state shown in the FIG. 10, the blade 30 of the wind turbine is used as the installation object, and is pulled by the guy cable rope 7 that is wound around the guiding pulley 5 on the truss 20 and extends out.

The adaptive boom guy cable system includes the guy cable bracket as described above and two hoists 40, each of which provide the traction steel wire rope 7. The two hoists 40 are respectively arranged corresponding to the two trusses 20, and the traction steel wire rope 7 extended by each of the two hoists 40 bypasses the corresponding hawser guiding portion 5, and one end of the hawser is configured for pulling the lifting device 31.

It should be noted that the hoists 40 may be configured independently. In this solution, it is preferable to use the two hoists 40 provided on the boom 10 of a crane of the installation ship as the hawser of the guy cable system to reasonably control the construction cost. As shown in FIG. 10, after the traction steel wire rope 7 of the hoist 40 is extended, the direction of the traction steel wire rope 7 is changed through a direction-changing pulley 8 provided on the boom 10, then the traction steel wire rope 7 extends along the truss 20 to the guiding pulley 5 at an outer end of the truss 20, and passes through and extends from the guiding pulley 5 and pulls the lifting device 31 for installing the blade 30.

Furthermore, in order to further avoid sudden changes in the adjustment process of the force acted on the guy cable, which otherwise causes the guy cable bracket to be in a relatively bad stress state, an automatic adjustment control method is further provided in this solution. The adaptive boom guy cable system specifically includes two tension sensors 50 and a controller 100.

As shown in FIG. 10, two tension sensors 50 are respectively provided on the two traction steel wire ropes 7 for collecting a tension force of the traction steel wire ropes and transmitting the tension force to the controller 100. The controller is configured to output a first control instruction to the driving component based on the tension force, that is, to output the first control instruction to the servo motor 24 so as to adjust a working length of the connecting rope group 22. The first control instruction is a control signal for adjusting tightening and releasing the rope. In this way, the servo motor 24 drives the winding component to rotate, thereby realizing closed-loop control of adjusting the operating position of the hawser guiding portion relative to the boom, ensuring the guy cable tension force to be balanced to further ensure the safety and reliability of installation and construction.

As shown in FIGS. 2 and 10, the adaptive boom guy cable system further includes a support oil cylinder 60. Two ends of the support oil cylinder 60 are respectively hinged with the truss rod bodies of the second truss rod 2 and the third truss rod 3 to further improve the overall load-bearing capacity of the guy cable bracket. In addition, based on the tension force adopted by the corresponding tension sensor 50, the controller 100 is further configured to output a second control instruction to a control end of the support oil cylinder 60, and adjust the working length of the support oil cylinder 60 by controlling a hydraulic oil conduction state in two chambers of the support oil cylinder 60, which, in cooperation with the adjustment of the working length of the connecting rope group 22, allows the second truss rod 2 to be in a good stress state and improves the load-bearing stability.

Figure 11:
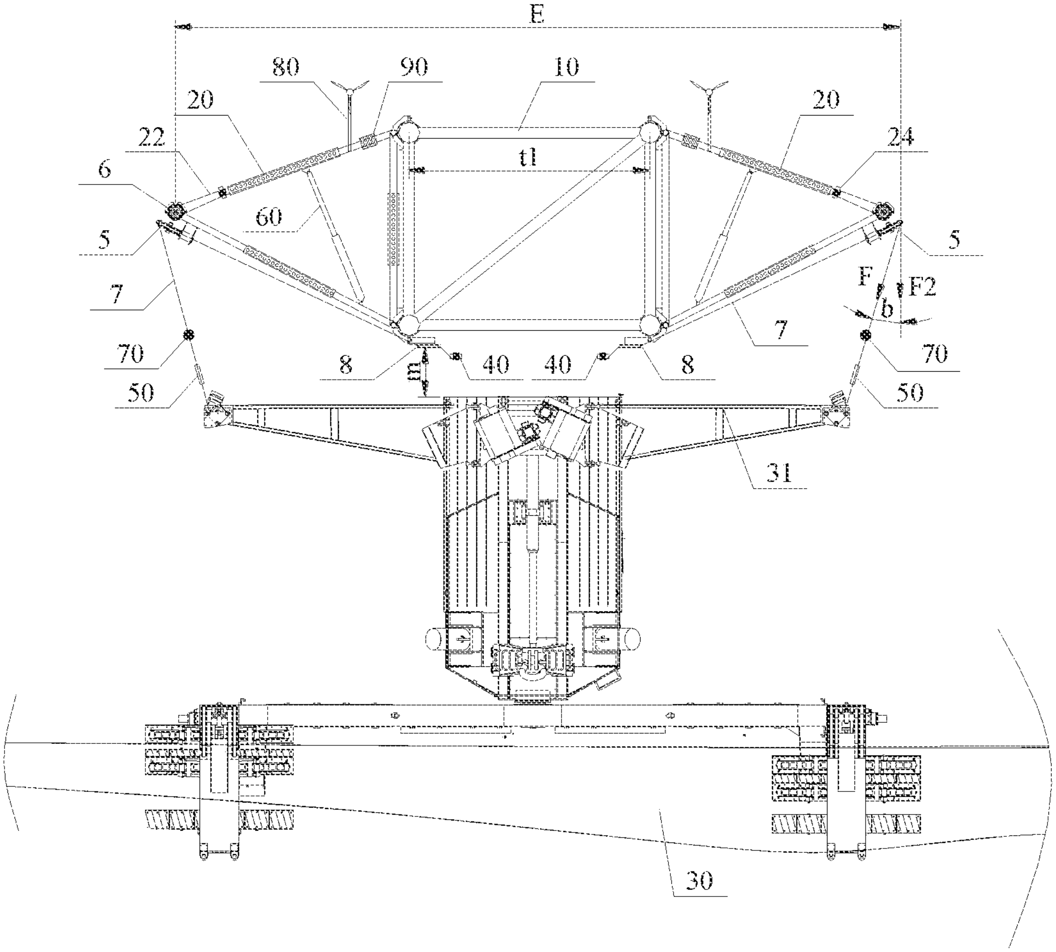
FIG. 11 is a schematic view showing another usage state of the adaptive boom guy cable system according to the embodiment.

A mechanism for realizing closed-loop control of the operating position of the guiding pulley 5 is briefly described hereinafter with reference to FIGS. 10 and 11. FIG. 11 is a schematic view showing another usage state of the adaptive boom guy cable system shown in FIG. 10.

As shown in FIG. 10, a tension force in the extending direction of the traction steel wire rope 7 collected by the tension sensor 50 is represented as F, and the tension force F has a component F1 in the pulling direction. An included angle "a" is formed between the extending direction of the traction steel wire rope 7 and the pulling direction.

In response to detecting that the tension force F is much great (for example, but not limited to, more than 5 tons) by the tension sensor 50, the servo motor 24 receives the first control instruction and starts to release the steel wire rope of the connecting rope group 22, and the working length of the connecting rope group 22 becomes larger. That is, the distance between the truss rod body 21 and the hinged pulley system 6 becomes larger, and thus the angle "a" between the extending direction of the traction steel wire rope 7 and the pulling direction changes.

As shown in FIG. 11, the included angle "a" becomes an included angle "b". On the basis that F is the same, F has a component force F2 in the pulling direction. Since the angle "a" is less than "b", F1 is greater than F2. In other words, with the above adjustments, the component force in the pulling direction can be reduced, so as to ensure that the guy cable bracket is too stressed during the construction process.

During this process, the support oil cylinder 60 can simultaneously adjust the support length in real time based on the angle changing. The hoist 40 does not need to move under normal circumstances and can be used to release the tension force F in the standby state. The "standby state" here includes situations where the servo motor 24 is stuck, the hinged pulley system 6 cannot release the rope smoothly, and the support oil cylinder 60 cannot perform a pushing or pulling operation.

Figure 12:
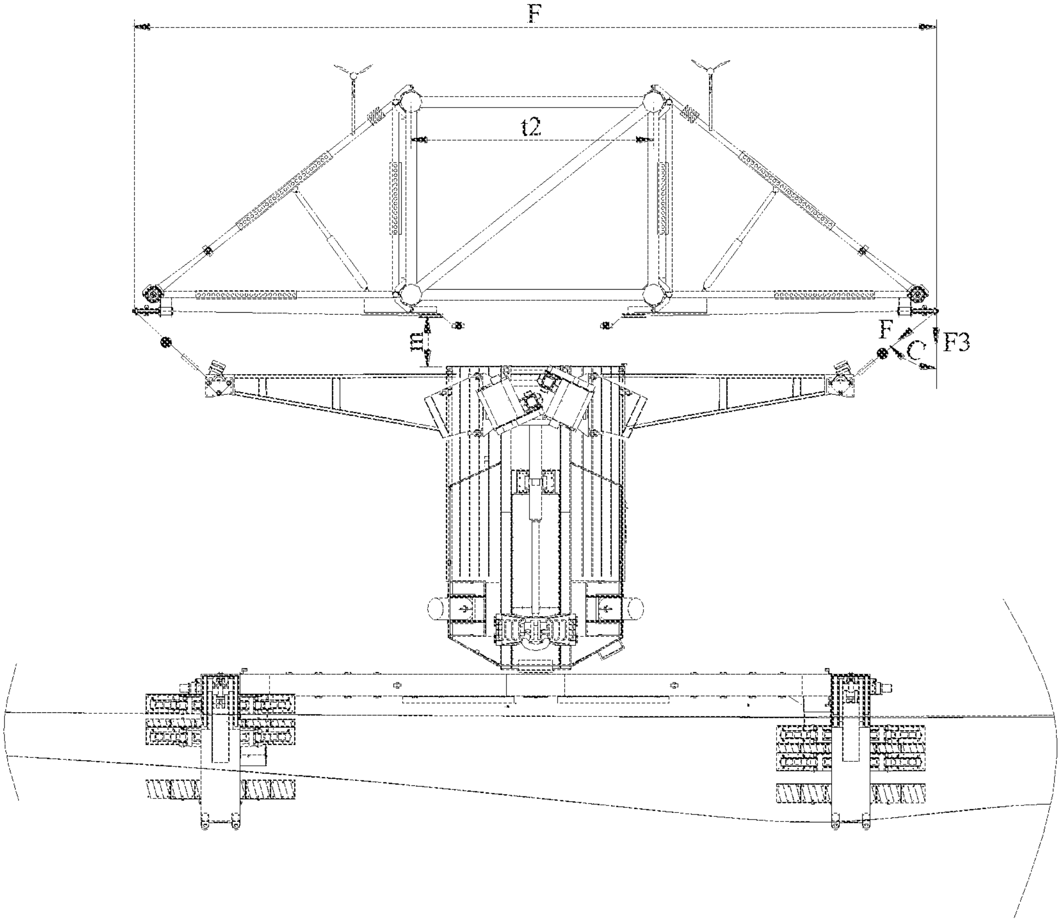
FIG. 12 is a schematic view showing yet another usage state of the adaptive boom guy cable system according to the embodiment.

As shown in FIG. 10, the distance between the lifting device 31 and the structure of the boom 10 is set to m, the distance between the two guiding pulleys 5 is set to D, and the distance between the structural arms of the boom 10 is set to t. For different sizes of boom 10 structures, the size of the boom can be matched by adjusting the distance between the two guiding pulleys 5. Specifically, the distance E shown in FIG. 11 can match the boom with the arm rod distance t1, or the distance F shown in FIG. 12 can match the boom with the arm rod distance t2, so as to ensure the guy cable force to be always within a set range.

Furthermore, damping devices 70 are respectively provided on the two traction steel wire ropes 7. The damping devices 70 can consume energy to provide buffering in a case of the tension force being suddenly changed, thereby avoiding the influence of the sudden tension force of the lifting device 31 on the traction steel wire rope 7, and further ensuring the uniform wind load of the guy cable force and ensuring the safety of the installation operation.

In addition, the adaptive boom guy cable system according to the present embodiment can further form an overall control strategy based on the current wind speed data to maximize the uniformity of the guy cable force.

Figure 13:
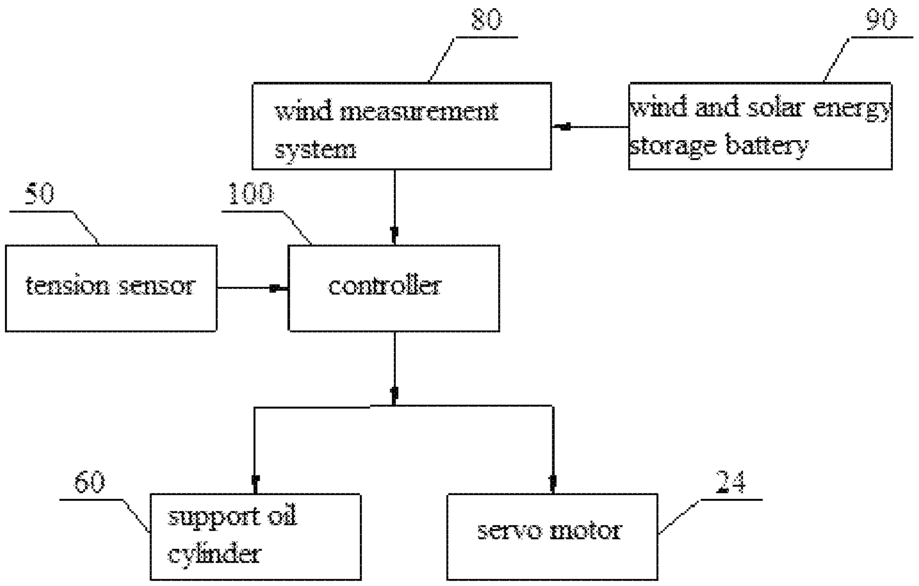
FIG. 13 is a control block diagram of the adaptive boom guy cable system according to the embodiment.

As shown in FIG. 10, a wind measurement system may be provided on the guy cable bracket to collect wind data, for example, but not limited to data signals such as a wind speed and a wind direction. The wind measurement system transmits the data signals to the controller 100 to be used as basic parameters for comprehensive judgment. The controller 100 outputs the corresponding control instructions to the servo motor 24 and the support oil cylinder 60 at the corresponding side. Reference is made to FIG. 13, which shows a control block diagram of the adaptive boom guy cable system according to the present embodiment.

Correspondingly to the wind measurement system 80, a wind and solar energy storage battery 90 may be further provided to provide power for the wind measurement system 80 and can be used for collection and feedback of signals in the entire control-loop. Here, wind energy and solar energy can be fully utilized for energy storage, which is in line with the design trend of clean energy utilization. In addition, the wind and solar energy storage battery 90 further includes an external charging interface. When the electric energy stored by wind energy and solar energy cannot meet actual needs, the external charging interface can also be used. It should be noted that the core conception of the present application does not lie in the wind and solar energy storage battery 90 and the specific functions of the wind and solar energy storage battery 90, which can be implemented by those skilled in the art based on the conventional technology, and thus will not be repeated here.

The adaptive boom guy cable bracket structure according to the embodiment can match the installation of the crane booms of different installation ships, and can realize a wide range of angle adjustment to adjust the guy cable tension force to be optimal. The damping device and the wind measurement and power supply system are provided in this solution, which can ensure the problem of guy cable tension force and buffering. In addition, the installation of the connecting ports of different installation ships can be universal, thereby greatly reducing the manufacturing costs of the guy cable bracket.

The above descriptions are merely preferred embodiments of the present application. It should be noted that various improvements and modifications can be made by those skilled in the art without departing from the principles of the present application. These improvements and modifications should fall within the protection scope of the present application.

What is claimed is:

1. An adaptive boom guy cable bracket, configured to be mounted on a boom, wherein the adaptive boom guy cable bracket comprises two trusses arranged symmetrically with respect to the boom;

in a first projection plane perpendicular to a length direction of the boom, three truss rods of each of the two trusses are arranged in a triangular shape, one end of a second truss rod is hinged with one end of a first truss rod and one end of a third truss rod is hinged with the other end of the first truss rod, the other end of the second truss rod is hinged with the other end of the third truss rod, and the first truss rod, the second truss rod and the third truss rod each is adjustable in length;

wherein each of two ends of the first truss rod is provided with a detachable connecting part which is adaptable to the boom, and the second truss rod or the third truss rod is provided with a hawser guiding portion.

2. The adaptive boom guy cable bracket according to claim 1, wherein two groups of the first truss rod, the second truss rod and the third truss rod are provided, and in a second projection plane parallel to the length direction of the boom, first truss rods in the two groups are spaced apart, and the other end of the second truss rod and the other end of the third truss rod in each of the two groups are intersected.

3. The adaptive boom guy cable bracket according to claim 2, wherein the second truss rod is located above the third truss rod; the second truss rod comprises a truss rod body and a connecting rope group, wherein the truss rod body is provided with a winding component for winding the connecting rope group, and the other end of the third truss rod is provided with a hinged pulley system; the connecting rope group is wound around the hinged pulley system, and a working length of the connecting rope group is adjusted by a driving component for driving the winding component to rotate.

4. An adaptive boom guy cable system, comprising:

the adaptive boom guy cable bracket according to claim 2; and two hoists, which are respectively provided corresponding to the two trusses, wherein a traction steel wire rope of each of the two hoists bypasses the corresponding hawser guiding portion, and one end of the traction steel wire rope is configured to pull a lifting device.

5. The adaptive boom guy cable bracket according to claim 1, wherein the second truss rod is located above the third truss rod; the second truss rod comprises a truss rod body and a connecting rope group, wherein the truss rod body is provided with a winding component for winding the connecting rope group, and the other end of the third truss rod is provided with a hinged pulley system; the connecting rope group is wound around the hinged pulley system, and a working length of the connecting rope group is adjusted by a driving component for driving the winding component to rotate.

6. The adaptive boom guy cable bracket according to claim 5, wherein the detachable connecting part is a hold hoop structure.

7. An adjustment method for an adaptive boom guy cable system, wherein the adaptive boom guy cable system comprises:

the adaptive boom guy cable bracket according to claim 6; and two hoists, which are respectively provided corresponding to the two trusses, wherein a traction steel wire rope of each of the two hoists bypasses the corresponding hawser guiding portion, and one end of the traction steel wire rope is configured to pull a lifting device; wherein the adjustment method for the adaptive boom guy cable system comprises:

driving the winding component to rotate to adjust a working length of the connecting rope group, and adjusting an included angle between an extending direction of the traction steel wire rope and a pulling direction by a change in an operating position of the hawser guiding portion.

8. The adaptive boom guy cable bracket according to claim 5, wherein the first truss rod and the second truss rod each comprises a truss rod body, truss rod bodies of the first truss rod, the second truss rod and the third truss rod are configured to have a first rod, a second rod and a middle adjustment sleeve, and the first rod and the second rod are inserted into the middle adjustment sleeve from two ends, respectively, and the length of the corresponding truss rod body is adjusted by adjusting insertion lengths of the first rod and the second rod.

9. The adaptive boom guy cable bracket according to claim 8, wherein a plurality of adjusting pin holes spaced apart along an axial direction are formed in the middle adjustment sleeve, a plurality of pin fixing holes are formed in the first rod and the second rod and are configured to be aligned with the corresponding adjusting pin holes based on the insertion lengths of the first rod and the second rod, and are fixed by positioning through pins in the pin fixing holes and the corresponding adjusting pin holes.

10. The adaptive boom guy cable bracket according to claim 5, wherein the hawser guiding portion is a guiding pulley for which a hawser is extendable in a universal direction.

11. The adaptive boom guy cable bracket according to claim 5, further comprising a support oil cylinder, wherein two ends of the support oil cylinder are respectively hinged with the truss rod bodies of the second truss rod and the third truss rod.

12. An adjustment method for an adaptive boom guy cable system, wherein the adaptive boom guy cable system comprises:

the adaptive boom guy cable bracket according to claim 5; and two hoists, which are respectively provided corresponding to the two trusses, wherein a traction steel wire rope of each of the two hoists bypasses the corresponding hawser guiding portion, and one end of the traction steel wire rope is configured to pull a lifting device; wherein the adjustment method for the adaptive boom guy cable system comprises:

driving the winding component to rotate to adjust a working length of the connecting rope group, and adjusting an included angle between an extending direction of the traction steel wire rope and a pulling direction by a change in an operating position of the hawser guiding portion.

13. The adjustment method for an adaptive boom guy cable system according to claim 12, wherein the driving the winding component to rotate to adjust a working length of the connecting rope group comprises:

outputting a first control instruction to the driving component based on a tension force of the traction steel wire rope, and adjusting the working length of the connecting rope group by the driving component.

14. The adjustment method for an adaptive boom guy cable system according to claim 13, wherein a support oil cylinder is hinged between the truss rod bodies of the second truss rod and the third truss rod; and in addition to that the first control instruction is outputted to the driving component based on the tension force of the traction steel wire rope, a second control instruction is outputted to a control end of the support oil cylinder, to adjust a working length of the support oil cylinder.

15. An adaptive boom guy cable system, comprising:

the adaptive boom guy cable bracket according to claim 1; and two hoists, which are respectively provided corresponding to the two trusses, wherein a traction steel wire rope of each of the two hoists bypasses the corresponding hawser guiding portion, and one end of the traction steel wire rope is configured to pull a lifting device.

16. The adaptive boom guy cable system according to claim 15, further comprising:

two tension sensors, which are respectively provided on the two traction steel wire ropes and are configured to collect a tension force of the two traction steel wire ropes; and a controller, configured to output a first control instruction to the driving component based on the tension force, to adjust a working length of the connecting rope group.

17. The adaptive boom guy cable system according to claim 16, further comprising a support oil cylinder, two ends of the support oil cylinder are respectively hinged with the truss rod bodies of the second truss rod and the third truss rod, and the controller is further configured to output a second control instruction to a control end of the support oil cylinder based on the tension force, to adjust a working length of the support oil cylinder.

18. The adaptive boom guy cable system according to claim 16, further comprising:

a wind measurement system, provided on the guy cable bracket and configured to collect wind data and transmit the wind data to the controller; and a wind and solar energy storage battery, configured to provide power for the wind measurement system, wherein the wind and solar energy storage battery further comprises an external charging interface.

19. The adaptive boom guy cable system according to claim 15, further comprising:

two damping devices, which are respectively provided on the two traction steel wire ropes.

20. The adaptive boom guy cable system according to claim 9, further comprising:

a wind measurement system, provided on the guy cable bracket and configured to collect wind data and transmit the wind data to a controller; and a wind and solar energy storage battery, configured to provide power for the wind measurement system, wherein the wind and solar energy storage battery further comprises an external charging interface.

* * * * *